Oct. 13, 1936.  V. KARAPETOFF  2,057,529
ELECTRICAL DISTRIBUTION SYSTEM
Filed Sept. 17, 1930
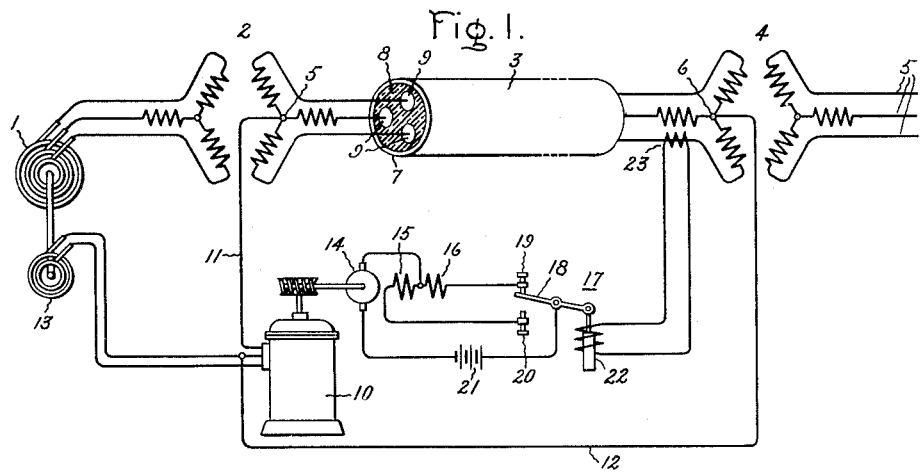
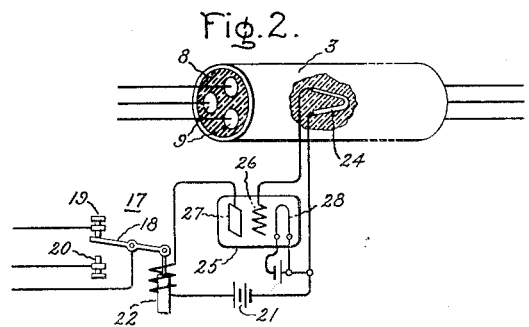
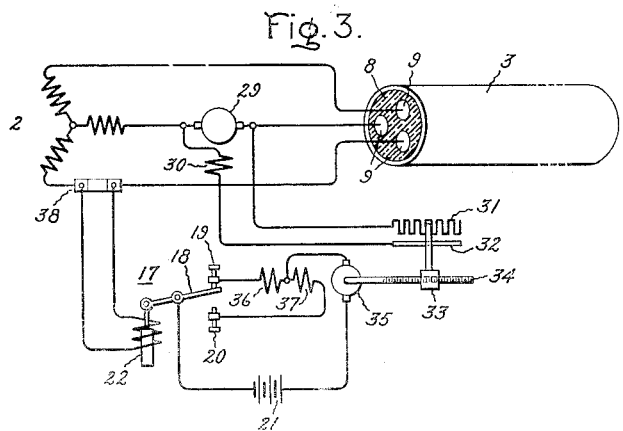
Inventor:
Vladimir Karapetoff,
by Charles E. Tullar
His Attorney.

Patented Oct. 13, 1936

2,057,529

UNITED STATES PATENT OFFICE 2,057,529

ELECTRICAL DISTRIBUTION SYSTEM

Vladimir Karapetoff, Ithaca, N. Y., assignor to General Electric Company, a corporation of New York Application September 17, 1930, Serial No. 482,543

13 Claims. (Cl. 171—97)

My invention relates to electrical distribution systems and more particularly to high voltage distribution systems employing high voltage insulated electric cables.

It has been found that the aging and deterioration of the insulation of electric cables is considerably accelerated if the cable is subjected to over-voltage while it is alternately heated and cooled. It seems that mere over-voltage alone, provided of course that the voltage is not sufficient to cause breakdown of the insulation, or alternate heating and cooling alone are not sufficient to cause an appreciably accelerated deterioration of the dielectric. The accelerated aging when the cable is subjected to both over-voltage and alternate heating and cooling is explained on the ground that the alternate heating and cooling produces voids in the insulation in the most effective manner while the ionization in these voids which is produced by the high voltage rapidly deteriorates the insulation.

The present trend in the transmission of electrical power is toward higher transmission voltages. It is, therefore, believed that the life of a cable in actual operation can be prolonged by not allowing it to go through as many cycles of heating and cooling as ordinarily take place, especially in cold weather. One of the most important factors governing the temperature of a cable is the electric current flowing through it and if this current were maintained at a high enough value all the time the temperature of the cable, due to changes in the ambient, or surrounding, temperature would not vary enough to be harmful in most cases. However, it is not usually practical to maintain a constant load current in the cable. I, therefore, provide heating means for the cable preferably in the form of an auxiliary circulating heating current of low voltage. Through suitable control means this auxiliary heating current may be varied in response to temperature changes in the cable or it may be made to vary inversely with the load or power current in the cable so as to maintain the total current substantially constant.

An object of my invention is to provide a new and improved electrical distribution system of the type employing high voltage insulated cable.

Another object of my invention is to provide means for circulating an auxiliary heating current in a high voltage insulated cable.

My invention will be better understood from the following description taken in connection with the accompanying drawing and its scope will be pointed out in the appended claims.

In the drawing Fig. 1 is a diagrammatic illustration of an embodiment of my invention in which the circulating current is an alternating current which is controlled in response to variations in the total current in the cable; Fig. 2 illustrates how the control may be made responsive to the temperature of the cable; while Fig. 3 illustrates another modification in which the circulating current is a direct current.

In Fig. 1 I have shown a substantially constant high voltage three phase transmission or distribution system comprising a three phase alternating current generator 1 and a step-up transformer or transformers 2, a three phase insulated cable 3, a step-down transformer or transformers 4 and a load circuit 5. The secondary winding of the step-up transformer 2 and the primary winding of the step-down transformer 4 are arranged to provide neutral connection points and, as shown, are star connected so as to provide neutral points 5 and 6 respectively. Cable 3 which is of the conventional type comprises a sheath 7 usually made of lead insulating material 8 and three conductors 9. My invention, moreover, is not limited to the use of a single multi-conductor cable and it will become obvious to those skilled in the art, as the description of my invention proceeds, that three single conductor cables may be substituted for cable 3 without departing from my invention in its broader aspects.

The circuit for supplying the auxiliary heating current to the cable comprises the secondary winding of an induction voltage regulator 10 which is connected by conductors 11 and 12 to the neutral points 5 and 6 of the transformers. The primary winding of induction voltage regulator 10 is energized by any suitable source of alternating current, the one shown being of low voltage single phase alternating current generator 13. Induction voltage regulator 10 is of the conventional type and consists primarily of an auto-transformer whose primary and secondary windings are relatively rotatable. Thus, by varying the angle between the axes of the windings of regulator 10 the voltage of the circuit supplying heating current to the cable may be varied.

A small reversible pilot motor 14 is connected to regulator 10 for operating purposes, reversal being secured by selectively energizing one or the other of its field windings 15 and 16.

The selective energization of reversing fields 16 and 15 is preferably secured by means of an electromagnetically operated contact making device 17, whose pivotally mounted contact 18 engages in either of its extreme positions fixed contacts 19 and 20, which are connected respectively with field windings 16 and 15, the return circuit through motor 14 including a suitable source of current such as a battery 21. The operating solenoid 22 of contact device 17 is energized in accordance with the total current in one of the conductors of cable 3 by means of a current transformer 23.

The operation of the embodiment of my invention illustrated in Figure 1 is as follows: Assume that the transmitting station comprising alternating current generator 1 and transformer 2 is sending power through cable 3 to the receiving station comprising step-down transformer 4 and load circuit 5. Contact making device 17 is so arranged that when the total current flowing in the cable is of the proper magnitude to maintain the cable at a substantially even temperature, its pivotally mounted contact 18 will be mid-way between fixed contacts 19 and 20. If now the power current through cable 3 should decrease, the energization of the solenoid 22 will decrease, thereby to move pivotally mounted contact 18 into engagement with fixed contact 19, whereby motor 14 is energized through field winding 16, with the result that regulator 10 produces an increased voltage in the circuit comprising cable 3, the regulator and conductors 11 and 12. This has the effect of increasing the auxiliary heating current which is superimposed on the power current in the cable, and when the new value of total current equals the predetermined value, pivoted contact 18 will again move to its mid position. Likewise, if the power current in cable 3 increases, the total current will increase whereby contact device 17 will cause the regulator to operate in the reverse direction to decrease the voltage in the auxiliary heating current circuit, whereby the value of this current is decreased until the total current in the cables returns to normal.

If in the arrangement illustrated in Figure 1 the frequency of the source 13 is the same as the frequency of the power current in the cable 3, the superposition of a single phase circulating current in the polyphase cable 3 will produce a certain unbalance between the currents in each of its conductors. This is because two similar shaped alternating currents of the same frequency add vectorially to give a resultant current of the same frequency whose magnitude depends upon the phase angle between the component currents. Consequently, if a single phase current is superimposed upon three phase current, the frequencies being the same, the three resultant currents will be different in magnitude. This, however, is not serious as it will be obvious that a certain average heating effect, and consequently a certain average temperature will be maintained. The values of the minimum and maximum current may be adjusted for different seasons of the year by adjusting the positions of fixed contacts 19 and 20.

To obviate current unbalance in cable 3, the heating current may be made of a different frequency than the power current. Thus if the power current is 60 cycles, the heating current may be 25 cycles. The reason that this prevents current unbalance is as follows. Two similar shaped alternating currents of different frequencies produce a resultant current having a different shaped wave form. This resultant current can be compared with its component currents through a comparison of effective values. The well known relation is that the effective value of the resultant equals the square root of the sum of the squares of the effective values of its two components. Therefore, as this relation is independent of phase angle the effective values of the currents in the three conductors will be the same although the wave forms will be different. As the heating value, which is directly proportional to the effective value, is the important factor, from the standpoint of my invention, the relay for controlling the heating current should be made responsive to the effective current. One such relay is the thermally responsive relay shown in Fig. 2.

No particularly accurate balancing of the auxiliary heating current is needed however. This is because the heat capacity of most cables is quite large. Any regulation which maintains the temperature of the cable within a few degrees of a predetermined minimum will accomplish its purpose. The important thing is not to allow the cable to cool off too much when the load decreases because it is then that voids are found within the insulation.

Fig. 2 illustrates an alternative way of controlling contact making device 17 in response to the temperature of the cable rather than to the current in the cable. In this figure part of the cable is broken away to show imbedded in the insulation a temperature responsive element, such as a thermocouple 24. As the current derived from such a device is too small to operate the contact making device 17 directly, an amplifier 25 is interposed between these elements. Any suitable amplifying device may be employed, the one illustrated being the usual vacuum tube in which changes in the potential of thermocouple 24 change the bias of grid 26 of the amplifier, and hence control the current between the plate 27 and filament 28 of this device. The plate circuit of this device includes the operating coil 22 of contact making device 17 and a suitable source of plate current 27'.

Although in Figure 1 I have shown separate return conductors 11 and 12, in actual practice this will often not be necessary. Thus a ground return could be employed or sheath 3 might be employed as the return conductor. Also where two cables are operated in parallel, each may operate as the return conductor for the other.

The modification illustrated in Figure 3 is designed to supply a direct current auxiliary heating current. Thus a small low voltage direct current generator 29 is inserted in one of the conductors of cable 3, the heating current produced by this generator flowing through a loop circuit comprising the conductor in which this generator is connected as one part, and the transformer windings and the remaining conductors in parallel as the other part. The voltage of this generator is controlled by varying the excitation of its field winding 30 by means of a motor operated rheostat comprising a variable resistance 31 and a movable contact arm 32, which slides thereover. This arm is moved by a nut 33 which is in threaded engagement with an extension 34 of the armature shaft of a motor 35, having reversing field windings 36 and 37 connected respectively with the fixed contacts 19 and 20 of contact making device 17. The operating magnet 22 of contact making device 17 is connected across the terminals of a shunt 38 which is inserted in one of the conductors of cable 3.

The operation of the embodiment of my invention illustrated in Figure 3 is as follows: If the total current in the conductor in which shunt 38 is connected decreases, the voltage drop across shunt 38 will decrease, thereby causing contact making device 17 to close the circuit through field winding 36 of motor 35 to cause this motor to move in a direction to decrease the resistance 31 with the result that the voltage of generator 29 increases, and consequently the direct circulating current produced by it increases.

This will continue until the voltage drop across the shunt returns to normal, when contact 18 will leave contact 19. In a similar manner an increase in total current in the cable 3 will cause contactor 17 to close the circuit through field winding 37 of motor 35, so that this motor operates in a reverse direction to increase the resistance, and consequently to decrease the field excitation of generator 29, with the result that the direct auxiliary heating current is decreased. In this manner the total current is kept substantially constant in the cable, and consequently the temperature of the cable is maintained practically constant.

Although I have only illustrated my invention as applied to three phase alternating current cables, it will be obvious to those skilled in the art that my invention is not so limited, and that it is applicable to systems having any number of phases as well as to direct current systems.

While I have shown and described particular embodiments of my invention, it will be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States, is:

1. In combination, a high voltage insulated power transmission cable, means for producing a high voltage power flow through said cable, and means responsive to the effect of an electrical condition of said cable which varies the temperature of the insulation of the cable for maintaining said effect substantially constant regardless of the magnitude of the high voltage power flow through said cable, said means including apparatus for circulating an auxiliary heating current in said cable.

2. The combination with a high voltage source of electrical energy and a high voltage electrical load, of an insulated cable joining said source and said load, said cable having a plurality of conductors for carrying the power current between said source and said load, a low voltage source of electrical energy, a circuit including a plurality of the power current carrying conductors of said cable and said low voltage source, and means for regulating said low voltage source so as to maintain a substantially constant thermal condition in said cable regardless of the magnitude of the energy transmitted by said cable.

3. In combination, a substantially constant high voltage power transmission system including an insulated high voltage power transmission cable, means for circulating a heating current in said cable which is separate from the power transmission current in said cable, and electro-responsive means for automatically maintaining the heating effect of the total current in said cable substantially constant regardless of variations in the power transmitted by said cable whereby the insulation temperature of said cable remains substantially constant.

4. In combination, a high voltage variable current power transmission system including an insulated electrical cable, means for circulating an auxiliary heating current through said cable, and means for varying the value of said auxiliary current inversely with variations in the power current in said cable so as to maintain the total effective heating current in said cable substantially constant regardless of the power transmitted by said cable.

5. In combination, a source of electrical energy, a load circuit, a power transmission cable interconnecting said source and said load circuit, means for controlling the heating of said cable independently of the current delivered to said load circuit, and means responsive to the temperature of said cable for controlling said heat controlling means.

6. In combination, a high voltage insulated power transmission cable, means for causing a power current to flow in said cable, means for causing an auxiliary heating current to flow in said cable, and means responsive to the temperature of said cable for controlling the value of said auxiliary current.

7. In combination, a polyphase high voltage power transmission system including a source, a load, an interconnecting polyphase high voltage cable, a circuit including an auxiliary source of current and the conductors of said cable, and means responsive to the total current in the conductors of said circuit for regulating the current in the conductors of said cable which is produced by said auxiliary source.

8. In a high voltage polyphase alternating current power transmission system, a polyphase cable connected to transmit polyphase power, a variable source of direct current connected in one of the conductors of said circuit whereby the return circuit for the direct current is through the remaining conductors of said cable, and means for varying the amount of direct current produced by said direct current source in a manner to maintain the total current in said conductor substantially constant.

9. The combination with a high voltage power transmission cable of means for maintaining said cable at substantially constant temperature comprising means responsive to the temperature of said cable for circulating therein a variable heating current.

10. A high voltage electrical system of distribution comprising a three phase star connected transmitting station, a similar receiving station, a three phase high voltage insulated cable connected between said stations, a source of current connected between the neutral points of said transmitting and receiving stations and means responsive to the current in one of the conductors of said cable for varying the amount of current produced by said source inversely with the amount of current flowing from said transmitting station to said receiving station.

11. In combination, a high voltage three phase insulated electric cable, means for producing a flow of high voltage three phase power through said cable, a direct current generator connected in one of the conductors of said cable, and means responsive to the current in one of the conductors of said cable for regulating the excitation of said generator in such a manner that the direct current produced by it varies inversely with the alternating current flowing through it.

12. In a high voltage alternating current distribution system, an insulated electric cable, a thermo-couple embedded in the insulation of said cable, a current amplifier controlled by said thermo-couple and means controlled by said amplifier for varying the magnitude of an auxiliary heating current in said cable.

13. The combination comprising a cable having a plurality of conductors adapted to carry the load current of a circuit in which the cable may be installed, a loop circuit in the cable, said loop circuit being composed entirely of load current carrying conductors of said circuit, and means for circulating a current in the loop circuit, whereby the temperature of the cable may be maintained substantially constant for various values of load current.

VLADIMIR KARAPETOFF.